April 14, 1953     J. E. SHEA     2,634,605
CONTRACTOMETER

Filed March 20, 1951            2 SHEETS—SHEET 1

INVENTOR.
John E. Shea
BY
ATTORNEYS

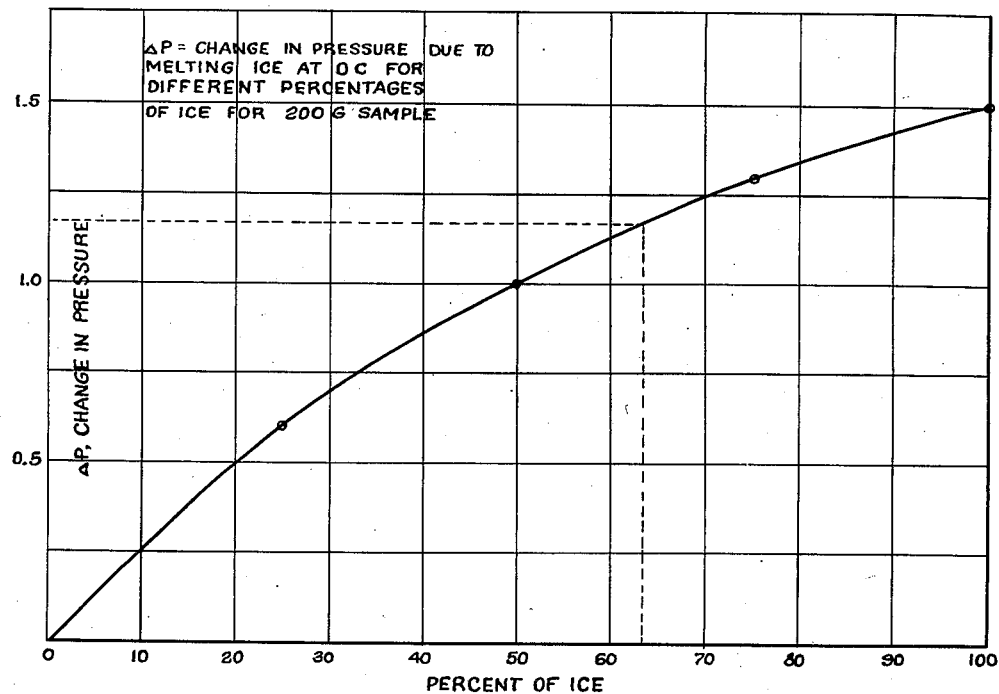

Patented Apr. 14, 1953

2,634,605

UNITED STATES PATENT OFFICE 2,634,605

CONTRACTOMETER

John E. Shea, Fairhaven, Va.

Application March 20, 1951, Serial No. 216,644

3 Claims. (Cl. 73—15.4)

(Granted under Title 35, U. S. Code (1952), sec. 266)

The invention described herein may be manufactured and used by or for the Government for governmental purposes, without payment to me of any royalty thereon.

The present invention provides a simplified testing equipment which is designed to indicate pressure variations in an enclosed volume of air or other gaseous medium responsively to changes in physical state of test materials, it being designed particularly, although not entirely so limitingly, for measuring the percentage of frozen water and the percentage of unfrozen water in a given sample of snow or ice, this being of importance in climatic environments where snow is available and readily utilizable as a structural material, for instance in arctic military operations in the building of airfields, runways, or other transportation courses.

More particularly, the present improved apparatus, which may be regarded as being defined by the empirical term "Contractometer," is designed to take advantage of the known expansion characteristic of water in changing from a liquid to a solid state. For example, it is known that water in changing from liquid to solid state expands approximately 9% of its original volume; and for purposes of illustration, it will be assumed that the expansion is exactly 9%. Thus, a sample of water which would have weighed 100 grams and would have occupied a volume of 100 cc., will occupy a volume of 109 cc. when frozen. If a sample which consists partly of frozen and partly of unfrozen water is found to have a volume of 106 cc., it may be shown that the percentage of ice is proportionate to the amount of expansion. Thus, if the expansion were 6 cc. instead of a maximum of 9 cc., the amount of frozen water would be 6/9×100 or 67 grams, and the amount of unfrozen water would be 33 grams.

In obtaining readings with the improved instrument, the sample being measured is carried in a liquid medium which in practice is kerosene, this being selected because it is lighter than water or ice. It has a very low freezing point and its expansion characteristics have been determined previously.

The improved apparatus of the present invention will be understood more readily by reference to the accompanying drawings which illustrate a preferred, illustrative embodiment thereof.

The invention will be understood more readily by reference to the accompanying drawings, in which:

Fig. 5 represents a reference or "standard" curve obtained for changes in pressure caused by the melting of ice for samples of known percentages of frozen and unfrozen water.

Figure 1:
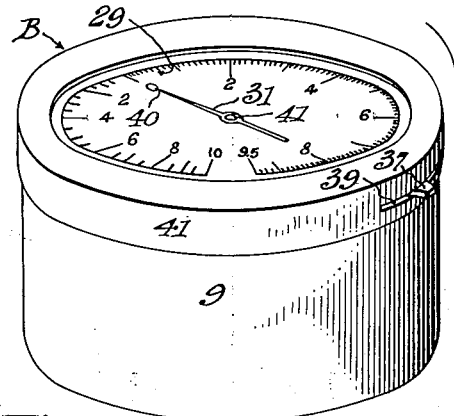
Fig. 1 is a perspective view of a preferred embodiment of the improved device of the present invention, the said device being shown in partly disassembled relation.
Figure 2:
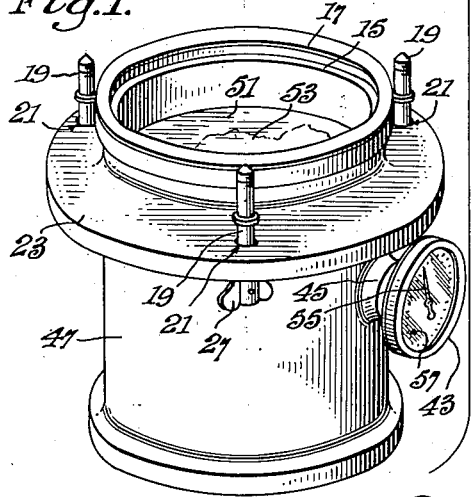
Fig. 2 is a vertical sectional elevation through the device of Fig. 1, the view being taken on the longitudinal vertical axis of the device, all parts thereof being shown as being assembled and in use.
Figure 2:
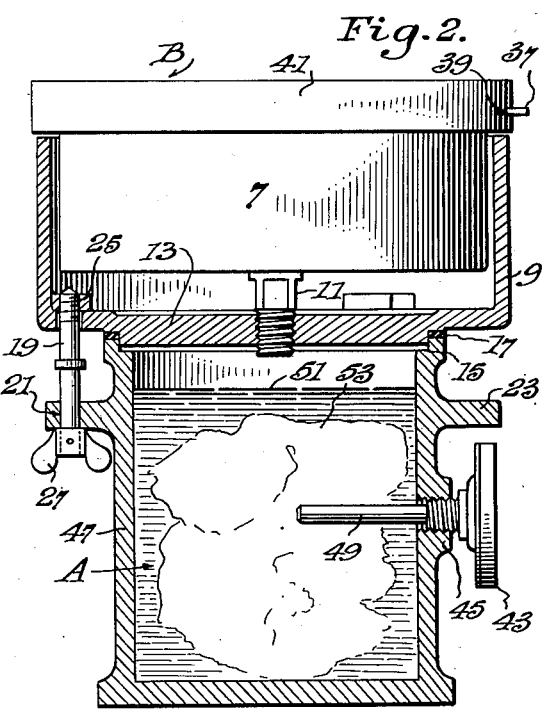

Referring more particularly to the drawings, the improved device of the present invention comprises essentially a sample chamber A which receives the sample to be measured, and a gauge B which is actuated by changes in air pressure in the sample chamber A responsively to temperature variations in the sample chamber, and due to variations in pressure incident to changes in state of the sample being tested. The actuating mechanism for the gauge is of standard construction and therefore needs not to be shown, but it is housed in a housing 7 which in turn is mounted in an outer housing 9 which defines a gauge chamber, this being superposed in practice on the sample chamber A, communication with the interior of the sample chamber A being had by way of a nipple 11 having a passage therethrough for bringing the interior of the gauge mechanism housing continuously into communication with the interior of the sample chamber A, this nipple 11 being threadedly mounted in the bottom 13 of the outer housing 9, this bottom 13 nesting into the top of sample chamber A adjacent to an annular shoulder 15 formed in the top of the sample chamber A, the outer housing 9 being of substantially greater diameter than the outside of the sample chamber A to seat thereon through the provision of a resilient gasket 17. The bottom 13 of the gauge chamber forms a top closure for the sample chamber A, the sample chamber being a base on which the gauge chamber is mounted and to which the gauge chamber is secured, thereby forming a unitary assembly of the sample chamber and the gauge chamber.

The outer housing 9 for the gauge chamber has an open top for receiving the gauge, and is secured in place by a series of locking pins 19 which pass through openings 21 provided therefor in an annular flange 23 on the outside of the sample chamber and which are secured in place by locking means mounted in the bottom of housing 9, as indicated at 25, to engage with upper threaded ends of the pins 19. The lower ends of the pins 19 have secured thereon wing nuts 27 for assisting the manipulation of these pins. The gauge is completed by a dial 29 graduated on one side in inches of mercury and on the other side in pounds per square inch, an indicating pointer 31 being rotatably positioned over the dial and actuated by the pressure-responsive mechanism of the dial. Adjustment of the dial relative to the pointer 31 may be effected by securing peripherally to the dial, as by screws 33, an adjusting plate 35 from which extends an adjusting lug 37 projecting through a slot 39 provided in the periphery of the top 41 of the dial housing 7. The lug 37 is engageable by an operator's finger and permits the dial 29 to be turned to bring the zero mark on the dial into registry with the indicating end 40 of pointer 31 whenever the dial may become misaligned from the pointer, the dial being turnable about and relative to the pivotal mounting 41 for the pointer 31.

A thermometer 43 is threadedly mounted in a bushing 45 provided therefor in a side of the container 47 which defines the sample chamber A. The thermometer 43 comprises a stem 49 which is immersed in a liquid 51 employed for receiving sample 53 being tested, the stem 49 containing temperature responsive elements, thermal expansion and contraction of which elements effects operation of a pointer 55 moving over a temperature-indicating dial 57.

In practice, the gauge B has a six inch face and reads from 0 pounds' pressure to 9.5 pounds' pressure and from 0 inches of mercury to 10 inches of mercury on the vacuum side. This gauge when integrated with the rest of the apparatus indicates changes in pressure in a fixed volume of air within the apparatus in the following manner: The sample chamber A has a volume of 1000 cc. During the test a weight of kerosene which will occupy exactly 700 cc. of volume at 40° C., as indicated on thermometer 49, is placed in the sample chamber. A weight of ice, which will occupy 200 cc. of volume when melted at 4° C., is added. This leaves an unfilled portion of space in the sample chamber which will be equal to 100 cc. of volume at 4° C. The purpose of the gauge is to register changes in the pressure exerted by the entrapped column of air due to changes that take place in the apparatus because of the expansion of kerosene with increasing temperature and the decrease in volume of ice (approximately 9% of its initial volume), which occurs when ice changes from a solid to a liquid state.

The operation of the device is illustrated by the following procedure:

1. Assume initial conditions to be −10° C.
2. Assume that a volume occupied by kerosene is 690 cc. (this will occupy 700 cc. at 4° C.).
3. Assume that the snow sample at −10° C. contains 10% moisture by weight of total sample.
4. Neglect the coefficient of expansion of ice and water.
5. Bring the entire apparatus and the oil to be used to the ambient temperature as shown on thermometer 43 by placing it in the snow to be tested.
6. Remove the cover and gauge from the apparatus and place in the sample chamber A the 690 cc. of kerosene and 200 grams of the snow to be tested.
7. Close and seal the apparatus. Under these conditions at −10° C. the volume of air in the apparatus will be 1000 cc. −(690 cc.+16.2 cc.+ 200 cc.)=93.8 cc. In the foregoing the 1000 cc. is the volume of the sample chamber; the 690 cc. is the volume of oil at −10° C. which will occupy 700 cc. at 4° C.; the 16.2 cc. is the number of cc. of expansion due to freezing of the frozen portion of the snow sample. The 200 cc. is the volume that will be occupied by the snow sample after it has melted and reached 4° C.
8. The apparatus then is removed from the ice bath and allowed to increase in temperature to 4° C.

As the temperature rises from −10° C. and above to 4° C., the kerosene expands and the volume of air is decreased from 93.8 cc. to some lesser figure and at the same time the pressure is increased in accordance with the well-known gas laws. This pressure increase is indicated on the gauge B, which is a standard commercial gauge.

This increased pressure is registered on the pressure dial. When 0° C. is reached and the frozen portion of the snow starts to melt, there will be a shrinkage in volume as ice changes to water in accordance with known physical laws and as this shrinkage takes place, the volume of entrapped air will be increased (as in this example amounting to 16.2 cc.), which will cause a decrease in the pressure of the air in accordance with Boyle's gas law. The pressure will continue to decrease until all of the ice is melted at 0° C. Then as the temperature of the apparatus is brought from 0° C. to 4° C., there will be a slight increase in pressure in the entrapped air due to the continued expansion of kerosene and air. The curve so obtained is compared with a standard curve (Fig. 5 of the drawings) which was made during calibration of the apparatus using samples containing known percentages of ice and water. A comparison of this standard curve with the unknown sample will enable an operator to establish the percent of unfrozen water existing in the field sample.

For research purposes, readings will be taken of the gauge needle at various time intervals throughout the length of the test. However, the critical readings are the readings at maximum pressure when the ice begins to melt and at minimum pressure when all of the ice has melted. The length of this line when compared under the same conditions with a solid block of ice gives a very definite measure of the frozen and unfrozen portions of the unknown sample. The purpose of taking additional readings during the course of the test is to investigate the possibilities that some melting may occur in fine particles of snow at temperatures below the freezing point of water, i. e. below 0° C., and also to establish a means of determining a relative grain size distribution of the sample in question by comparing its time rate of melting with that of a solid ice block and with other samples. The time rate of melting under fixed conditions of heat applications to the apparatus is a function of the total surface area of the sample being measured.

Figure 4:
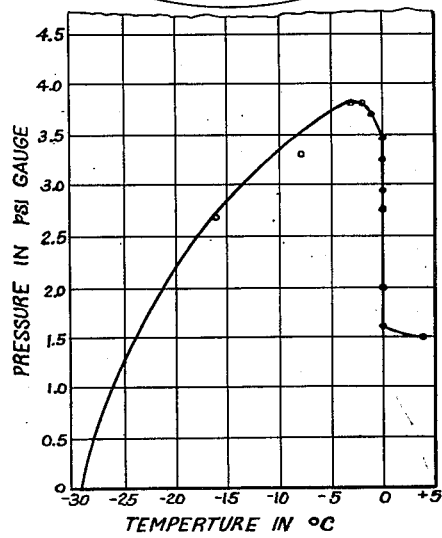
Fig. 4 represents a graph or curve obtained in actual field tests of the improved apparatus.
Figure 3:
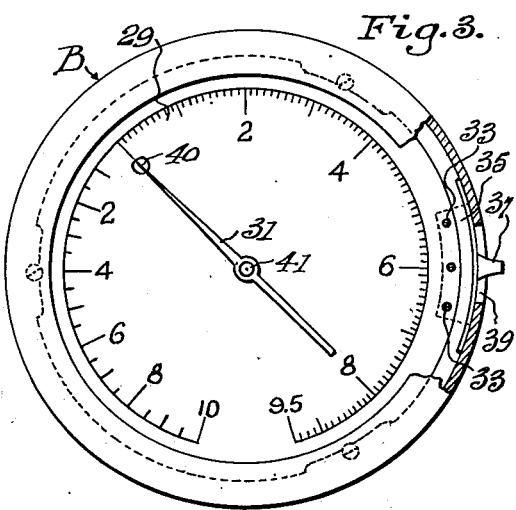
Fig. 3 is a top plan view of the device, showing a gauge employed in making determinations with the improved instrument of this invention.

The following results indicate the principle of operation of the contractometer, from which results the graph of Fig. 4 of the drawings was prepared. As the purpose of this test example was mainly to show the principle of operation, and not for calibration purposes, a scale of lower accuracy than needed for calibration was used, and the kerosene was measured, and not weighed, to give 700 cc. at +4° C. The following were the initial conditions:

a. All temperatures −29° C. (−20° F.).
b. Wt. of ice 680 grams ± 1 gram.
c. Volume of kerosene = 680 cc. at −29° C.
d. Pressure on gauge = 0 p. s. i. (gauge).

The contractometer was closed tightly and immersed in the ice water bath at 0° C., then upon stabilization of the pressure, it was allowed to warm up to 4° C., whereupon the last reading was taken.

The following data was taken during the run. No data was recorded by instruments other than on the contractometer (except time). This data is plotted as temperature versus gauge pressure, and the resulting graph is shown on Fig. 4 of the accompanying drawings:

| Time | Temperature, °C. | Pressure |
|---|---|---|
| 11:20 | −29 | 0 |
| 11:24 | −16 | 2.7 |
| 11:26 | −8 | 3.32 |
| 11:32 | −3 | 3.78 |
| 11:34 | −2 | 3.80 |
| 11:42 | −1 | 3.69 |
| 11:52 | 0 | 3.48 |
| 12:00 | 0 | 3.30 |
| 12:10 | 0 | 2.95 |
| 12:15 | 0 | 2.80 |
| 12:22 | 0 | 2.00 |
| 12:30 | 0 | 1.60 |
| 12:45 | +4 | 1.50 |

This data, plotted on Fig. 4 of the drawings, is to be compared with a so-called "standard" curve, Fig. 5 of the drawings, for the change in pressure (ΔP) caused by the melting of ice for samples of known percentages of frozen and unfrozen water. On Fig. 5, points were established for the following conditions: (a) 100% ice; (b) 75% ice; 25% water; (c) 50% ice; 50% water; (d) 25% ice; 75% water; (e) 100% water. Each sample had a total weight of 200 grams. In plotting Fig. 5, ΔP for the points referred to just above were obtained by taking the difference in pressures between the high point on a curve obtained in a manner similar to Fig. 4, and the low point at 0° C. on such curve for each sample taken, and plotting them against the percentage of ice in a 200 gram sample. For example, assume that a 200 gram sample of snow of unknown unfrozen moisture content is placed in the apparatus in accordance with the directions given above at 0° C., and the maximum and minimum points of a curve, similar to Fig. 4, are established. Assume that the difference in pressure is found to be 1.175 lbs./sq. in. Then selecting this point on the standard curve, Fig. 5, for 0° C. gives a percentage of ice equal to 63% and water 37%.

What I claim as new and wish to secure by Letters Patent is:

1. Method for determining frozen and unfrozen contents of a test specimen of snow or ice, which comprises enclosing a known weight of a test specimen in a closed container together with a known volume of air, mounting pressure-responsive indicating means in communication with the air in the container, heating the container and sample through a series of known temperature increments and values, recording changes in pressures produced by the enclosed volume of air in the closed container as the specimen sample passes through each temperature increment, the said increments including 0° C. and +4° C., maintaining the sample at 0° C. until completely melted without change in temperature, recording the pressure produced by the enclosed volume of air, plotting pressure changes against known samples as standards to form a curve indicating pressure differentially produced by complete change in state of the known sample, and comparing similar pressure differentials obtained by the test sample against the curve for the known sample.

2. A method for determining frozen and unfrozen contents of a test specimen of snow or ice, which comprises enclosing a known weight of a test specimen in a closed container together with a known volume of air, mounting pressure-responsive indicating means in communication with the enclosed air in the container, changing the temperature of the container and sample through a series of known temperature increments and values, recording resulting pressure changes produced by the enclosed volume of air, effecting a complete change of state in the sample without substantial change in temperature during the change in state, noting high and low pressure values conforming to such complete change in state in the sample, obtaining similar values for a series of standard samples composed of snow containing known amounts of frozen and liquid water, plotting changes in pressures for each standard of sample obtained during complete change of state of each of the said samples, and comparing similar values for the test specimen with the resulting standard curve for determining percentages of frozen and unfrozen components in the test specimen at temperatures corresponding to those of the standard samples.

3. Apparatus for measuring pressure variations in an enclosed volume of air or other gaseous medium responsively to changes in physical state of a specimen of test material such as in determining percentages of frozen water and of unfrozen water in a sample of snow or ice, which comprises, in combination, a specimen jar defining a sample chamber for receiving a sample of water in solid-liquid phase and of known weight, the jar having substantially straight walls and having an enlarged base for retaining the jar and assembled accessories in a stable substantially upright position when the jar and accessories are operatively assembled and placed in upright testing position on unevenly contoured field surfaces for field determinations, the said jar being of known volumetric capacity and also having an open wide mouth in its upper end for receiving a substantial specimen of the material being tested, a locking flange on the said jar projecting outwardly from the jar adjacent to its mouth, a cup-shaped closure for the mouth of the jar having a diameter substantially greater than that of the jar, the said closure having an unobstructed open top, an upright annular peripheral side wall, and a closed bottom, the latter having a depending thickened bottom sealing portion extending into the mouth of the jar and cooperating with the mouth of the jar to close the same, the bottom of the cup-shaped closure intermediate the sealing portion and the annular side wall of the closure extending outwardly beyond the jar and in spaced alignment with the locking flange on the jar and providing an annular bottom locking portion enclosing the said depending bottom sealing portion for attachment of the closure to the jar, releasable locking bolts extending through the locking flange and through the annular bottom locking portion of the closure, wing nuts on the bolts for releasably locking together the specimen jar and closure, the depending bottom portion of the closure being coextensive with the mouth of the jar and sealing the said mouth with an air chamber confined intermediate the test specimen and the bottom sealing portion of the closure, a pressure-responsive gauge mounted in the cup-shaped closure and closing the open top thereof and having an upwardly directed gauge-dial, a tubular mounting member for said gauge threadedly mounted in the sealing portion of the bottom of the closure and communicating with both the air chamber in the jar and with the gauge for transmitting to the gauge variations in air pressures in the air chamber, the gauge-dial being upwardly directed for continuous viewing of the dial by an observer looking downwardly thereon without requiring manipulation of the apparatus during testing operations, and a temperature indicator extending laterally through the jar into the specimen being tested.

JOHN E. SHEA.

References Cited in the file of this patent

UNITED STATES PATENTS

| Number | Name | Date |
| --- | --- | --- |
| 873,034 | Ely | Dec. 10, 1907 |
| 1,822,735 | Hastings | Sept. 8, 1931 |
| 2,102,105 | Zahm | Dec. 14, 1937 |
| 2,239,221 | Dimmock | Apr. 22, 1941 |

FOREIGN PATENTS

| Number | Country | Date |
| --- | --- | --- |
| 129,808 | Great Britain | July 17, 1919 |